W. R. VAN HOUGHTON.
SPRING-BED BOTTOM.

No. 173,090. Patented Feb. 1, 1876.

UNITED STATES PATENT OFFICE.

WILLIAM R. VAN HOUGHTON, OF CHICAGO, ILLINOIS.

IMPROVEMENT IN SPRING BED-BOTTOMS.

Specification forming part of Letters Patent No. 173,090, dated February 1, 1876; application filed December 27, 1875.

To all whom it may concern:

Be it known that I, WILLIAM R. VAN HOUGHTON, of Chicago, Cook county, and State of Illinois, have invented an Improvement in Spring-Beds, of which the following is a specification:

My invention relates to that class of spring-beds that are constructed of wooden slats, which are connected together by cross-pieces, and are connected to the frame by a number of metallic coil-springs, and with my improvement thereto attached.

My invention consists of two or more elliptic springs so arranged that they take the place of a portion of the coil-springs. The elliptic springs are constructed of wood, but can be made of metal.

My object is to cheapen the construction and increase the durability, by dispensing with as many of the coil-springs as possible, and introducing, as before mentioned, into their places, two or more wooden elliptic springs.

Figure 1:
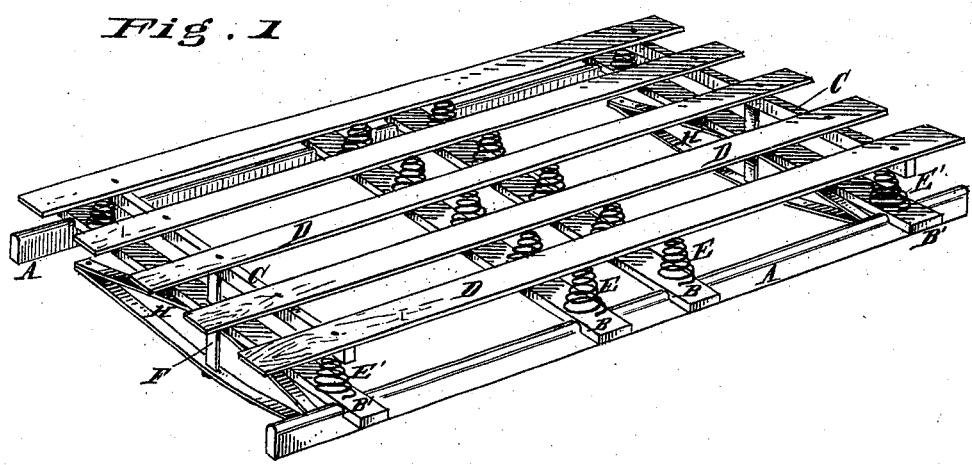
Figure 2:
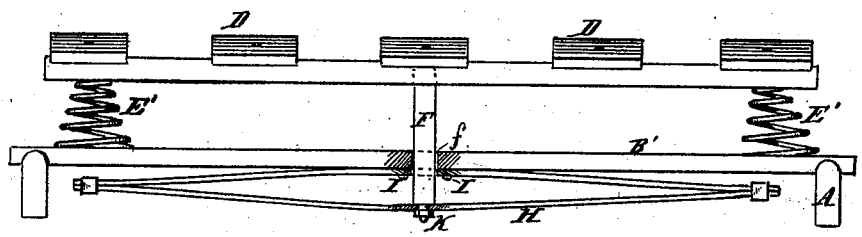
Figure 3:
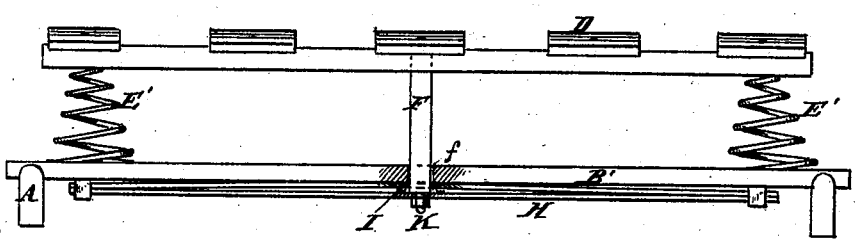

Figure 1 is a perspective view of the bed, embodying my invention. Fig. 2 is an end elevation of the same, showing elliptic spring in position when pressure has been put upon the slats. Fig. 3 is an end elevation of the same, showing elliptic spring before pressure has been put upon it.

A are the side bars of the frame of the bed, and are connected together by means of the cross-pieces B B'. The slats D are connected together by means of cross-pieces C. These slats D are connected to the frame by the coil-springs E in the middle, and E' on the ends and also by the iron bar F, which is bolted or otherwise fastened to the elliptic spring H, as will be hereinafter described.

On the ends, or where the elliptic spring is intended to be placed, there are but two coil-springs, one under each of the outer slats, as shown. Fastened into the cross-pieces C are flat bars of iron, F, which pass downward and through slots $f$, in the cross-pieces B' of frame, and also through the upper leaves of the elliptic springs H, and are bolted to the lower ones, as shown, Figs. 2 and 3. The elliptic springs H may be made of hickory, or other such wood, or, if preferable, of some light metal. The leaves are bolted or otherwise secured together at the ends. The upper leaf is bolted to the cross-piece B' at I, and the pressure is put upon the lower leaf by bar F which is bolted to it at K.

The gain of a spring of this construction over those that are made of one piece (similar to the upper leaf, with the pressure communicated at the ends) is, that each of the leaves have only to bend one-half that of the single spring, thus allowing them to hold their springing power for twice the period of the other.

When the pressure is put upon slats D and cross-pieces C, a portion of the pressure is transmitted through the rods F to the lower leaves of the elliptic springs H, and spreads the leaves, as shown in Fig. 2, thus giving springing power. When the pressure has been taken off the springs take the shape shown in Fig. 3.

I claim—

The elliptic spring H, in combination with the bar F, the cross-piece B', and the cross-piece C, operating substantially as herein specified.

In testimony of which invention, I hereunto set my hand.

WM. R. VAN HOUGHTON.

Witnesses:
R. M. HUNTER,
JNO. B. F. PHILLIPS.